May 8, 1962

S. N. G. THOMAS ET AL 3,033,975

WELDING APPARATUS

Filed Sept. 10, 1959

May 8, 1962 S. N. G. THOMAS ET AL 3,033,975
WELDING APPARATUS
Filed Sept. 10, 1959 2 Sheets-Sheet 2

United States Patent Office 3,033,975
Patented May 8, 1962

3,033,975
WELDING APPARATUS
Stanley Nisbet Goring Thomas, Darlington, and Andrew French, Sunderland, England, assignors to Whessoe Limited, Darlington, England
Filed Sept. 10, 1959, Ser. No. 839,151
7 Claims. (Cl. 219—125)

This invention relates to welding apparatus and is concerned with means for supporting the welding equipment proper and moving it progressively along the line of a required circular seam.

The invention comprises broadly apparatus for welding a circular seam in which a welding head of any suitable type is carried on a radius arm which is pivotally supported about an axis passing through the centre of the required circular seam and perpendicular to its plane, means being provided for rotating the radius arm about its pivot and thereby progressively moving the welding head along the line of the required seam.

Other features of the invention will sufficiently appear from the appended claims when read in the light of the following description of the particular embodiments of the invention which are illustrated in the accompanying drawing.

Figure 1:
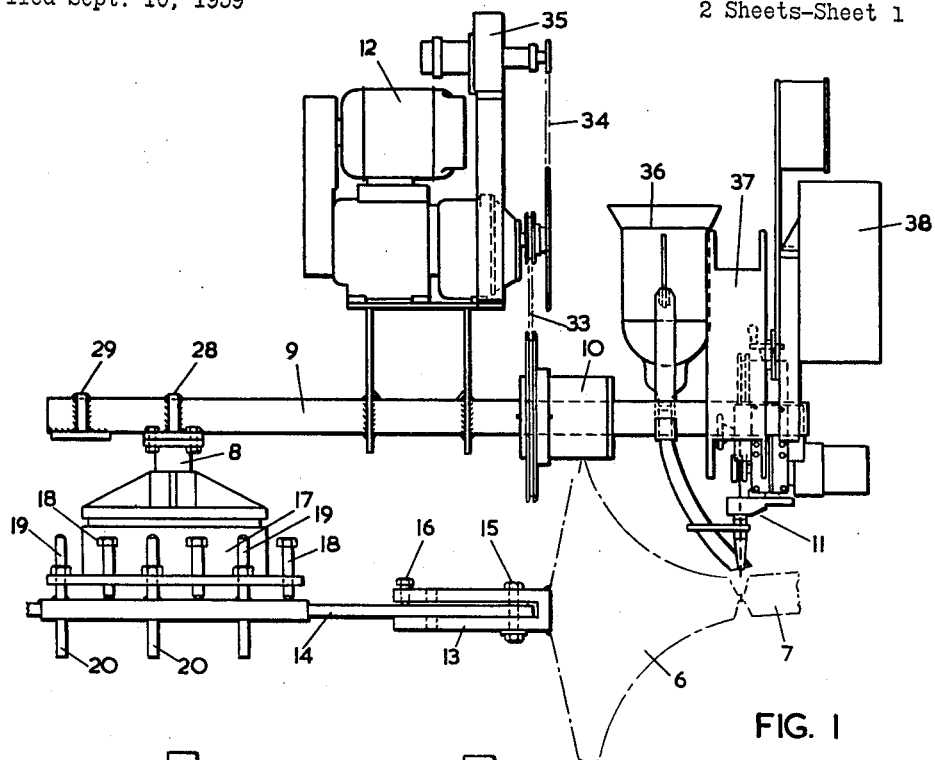
FIGURE 1 is a partial side elevation of one form of apparatus in accordance with the invention.
Figure 2:
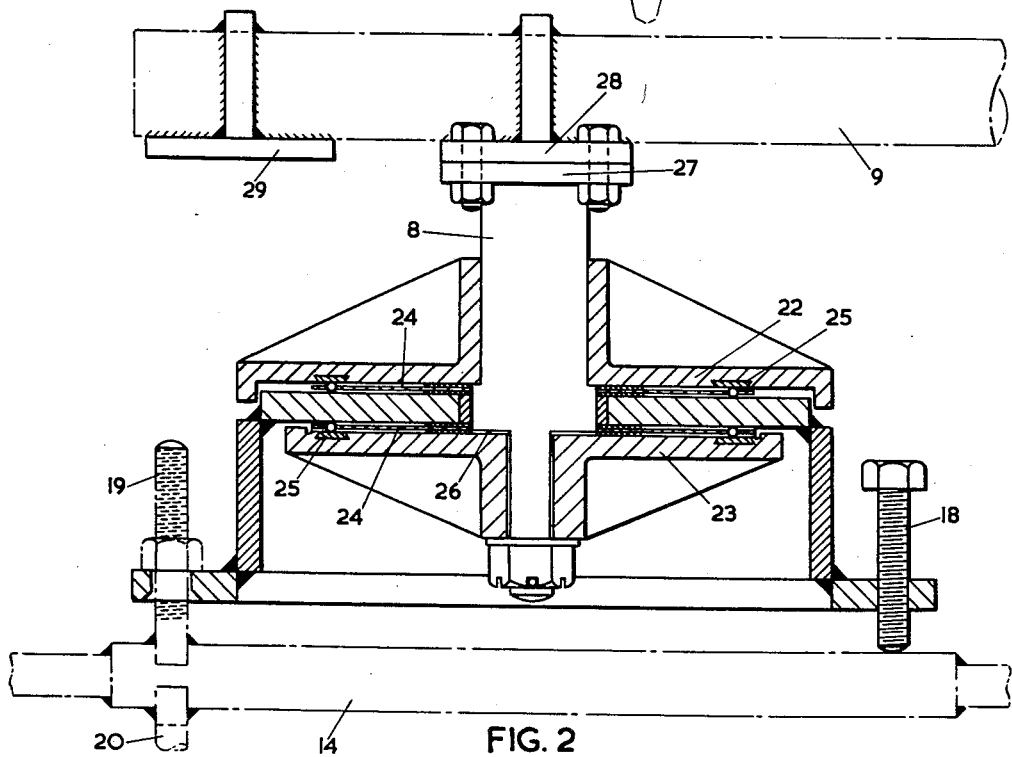
FIGURE 2 is a sectional elevation on a larger scale of part of the apparatus shown in FIGURE 1.

FIGURES 1 and 2 show a form of apparatus in accordance with the invention employed for butt welding to the shell plates of a vessel the periphery of a forged reinforcing ring to which an exterior and/or an interior duct can subsequently be welded. The ring has the substantially triangular cross section indicated at 6 in FIGURE 1 and may (for example) have a diameter of some five feet, the shell plates indicated at 7 having a thickness of some three inches.

To form the required circular seam, the ring 6 is disposed horizontally and the shell plates 7 to be welded to its outwardly projecting flange are supported in their required positions relative to the ring, as shown in FIGURE 1. To the reinforcing ring 6 there are temporarily attached means (described below) which provide at the centre of the ring a support for a short vertical pivot shaft 8. To the upper end of this shaft there is secured a horizontal arm 9 which projects radially over the ring 6 and is additionally supported by a drive wheel 10 resting on the upwardly projecting flange of the ring. This radius arm 9 supports the welding head indicated generally by the reference numeral 11 and also a motor 12 for rotating the drive wheel 10 at any required speed. When the wheel 10 rotates, the radius arm 9 is swung around the centre pivot, carrying the welding head along the line of the required seam between parts 6 and 7. When the weld seam on the upper face of the parts has been completed, the pivot shaft 8, the arm 9 and the equipment which it carries are lifted clear of the work. The work is then turned over and the pivot and radius arm are replaced and again driven round to complete the weld on the opposite face of the work.

The means for temporarily attaching the support for the pivot shaft to the forged ring comprise four bifurcated lugs, one of which is shown at 13, welded at equally spaced positions to the inner face of the ring, and a four armed spider 14, which has the outer end of each of its arms received by and bolted to one of the lugs. The lugs 13 have large clearance holes for the securing bolts 15 so that the support plate at the centre of the spider 14 can be centralised accurately within the ring, set bolts 16 on the lugs being then tightened to clamp the spider in position. The support plate at the centre of the spider 14 carries a pivot drum 17 comprising a vertical cylindrical wall with an outwardly projecting annular flange at its lower end and an annular top plate at its upper end. Six adjusting studs 18 threaded through the flange of the drum and bearing on the support plate of spider 14 allow the pivot drum to be accurately levelled; it can then be locked in position by tightening nuts on six holding down studs 19 (arranged alternately with the adjusting studs 18) which are fast in the support plate and pass through holes in the flange of the drum. Similar holding down studs 20 are provided on the lower face of the support plate, so that the pivot drum 17 can be secured to that face when the work is reversed to complete welding, the spider 14 remaining attached to the forged ring.

The central aperture in the top plate of the drum 17 is fitted with a bearing bush 21, in which the above mentioned vertical shaft 8 is journalled. The shaft 8 carries bearing flanges 22, 23 which project outwardly above and below the top plate of the drum 17 and between each flange and the adjacent face of the top plate there is interposed a disc 24 formed with a ring of apertures each accommodating a bearing ball 25, these balls running on tracks provided on the flange and the plate. The load on the balls can be adjusted by inserting shims (not shown) at 26, between a shoulder on shaft 8 and the bearing flange 23.

A horizontal plate 27 at the upper end of the shaft 8 is bolted to a bracket 28 fast on the above mentioned radius arm 9. One or more additional brackets are provided at different positions on the arms, as shown at 29, so that the same equipment can be used for welding seams of different diameters, correspondingly spaced alternative securing positions for the bolts 15 being provided on the lugs 13, welded to the forged ring 6. Before securing the radius arm 9 to the pivot shaft 8, a special template (not shown) is attached to the mounting plate 27 on the shaft and swung round to check that this plate is accurately level and set at the correct height, the adjusting and holding down studs 18, 19 being adjusted as found necessary.

As stated above, the revolving radius arm 9 carries a wheel 10 which runs on the upwardly projecting flange of the forged ring 6. This wheel has a knurled driving surface which is of sufficient width to accommodate any eccentricity of the centre pivot.

Between the driving wheel and the central pivot there is secured to the arm an upwardly projecting framework 30 which supports the electric motor 12, a hydraulic infinitely variable speed gear 31 and a fixed ratio mechanical reduction gear 32. The output shaft of the latter gear (which can be driven by the motor through the hydraulic gear in either direction at any speed from about 1 to about 15 r.p.m.) is coupled by a speed reducing chain drive 33 to the driving wheel 10 running on the flange of the forged ring and by a speed increasing chain drive 34 to a tachometer 35 supported above the motor and indicating to the operator the speed of travel of the welding head carried by the arm.

The welding head 11 is mounted on the arm on the outer side of the drive wheel, together with ancilliary welding equipment including flux hoppers 36, electrode reel 37 and control panel 38; the welding head, which is of a standard design, is adjustable to allow movement of the welding tip relative to the seam both vertically and horizontally. A guide light carried by the welding head and directed vertically downwards facilitates exact guiding of the electrodes along the required line of seam.

The driving gear and the greater part of the welding equipment are necessarily disposed above the longitudinal centre line of the radial support arm, which is consequently unstable about its axis, but the lateral support afforded by the ball races (which may have a diameter of, for example, some nine inches) included in the pivotal support is sufficient to resist any tendency for the gear to overturn about the longitudinal axis of the radius arm and gives very accurate and steady support to the whole revolving system, allowing it to turn smoothly with the minimum of drag on the drive motor.

Figure 3:
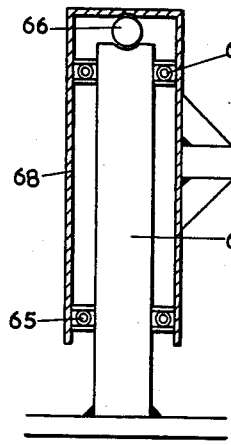
FIGURE 3 is a sectional elevation of part of a modified apparatus.

Instead of using a bearing of large diameter to resist such overturning couples, use may be made of a bearing of relatively small diameter but of extended axial length, a particular form of this alternative arrangement being shown in FIGURE 3. In this case the inner end of the radius arm 69 is secured to an elongated vertically disposed cylinder 68, closed at its upper end and open at its lower end, which engages over a stationary vertical post 67. The cylinder 68 is rotatably supported on the post 67 by a single large diameter bearing ball 66, which is engaged between the top of the post and the upper end of the cylinder, and by two annular ball bearings 64, 65 which are engaged between the circumference of the post and the wall of the cylinder near its upper and lower ends respectively. The bearing ball 66 forms a thrust bearing supporting the weight of the radius arm, while the bearings 64, 65 resist tilting forces tending to overturn the radius arm about its longitudinal axis.

With each of the alternative bearing constructions described above the support afforded for the radius arm by the central bearing could be so substantial than the arm will be supported independently of the arrangement of the driving wheel 10 with the track constituted by ring 6. In such a case, if the flange edge on which the wheel runs were even slightly out of level or undulated, the driving wheel would be liable to ride free of the track, thus ceasing to drive the radius arm. In practising the invention it has hitherto been found that careful attention to levelling and the inherent slight flexibility of the radius arm are sufficient to ensure that the driving wheel remains in contact with its track. However, if desirable in any particular case, a hinge may be included in the radius arm to permit vertical movement of the outer part of the arm and ensure that contact will be maintained between the driving wheel and the track on which it runs.

Figure 4:
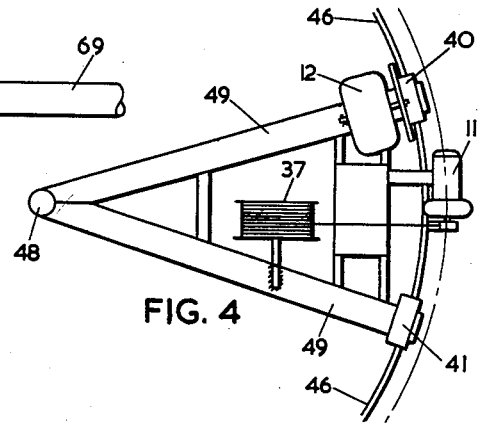
FIGURE 4 is a plan view of a further modification.

As an alternative to so constructing the central pivotal support for the radius arm that it will resist overturning moments caused by the load carried on the arm, the arrangement shown in FIGURE 4 may be adopted. In this case the radius arm is constituted by a framework 49 comprising two radially disposed beams diverging from a central pivot 48 of simple character and interconnected by cross members. At the outer ends of the radial beams are rollers or wheels 40, 41 which run on the same track 46 concentric with the required circular seam and are disposed in spaced relation along the length of this track, the wheel 40 being driven by the motor 12 while the wheel 41 is an idler.

Figure 5:
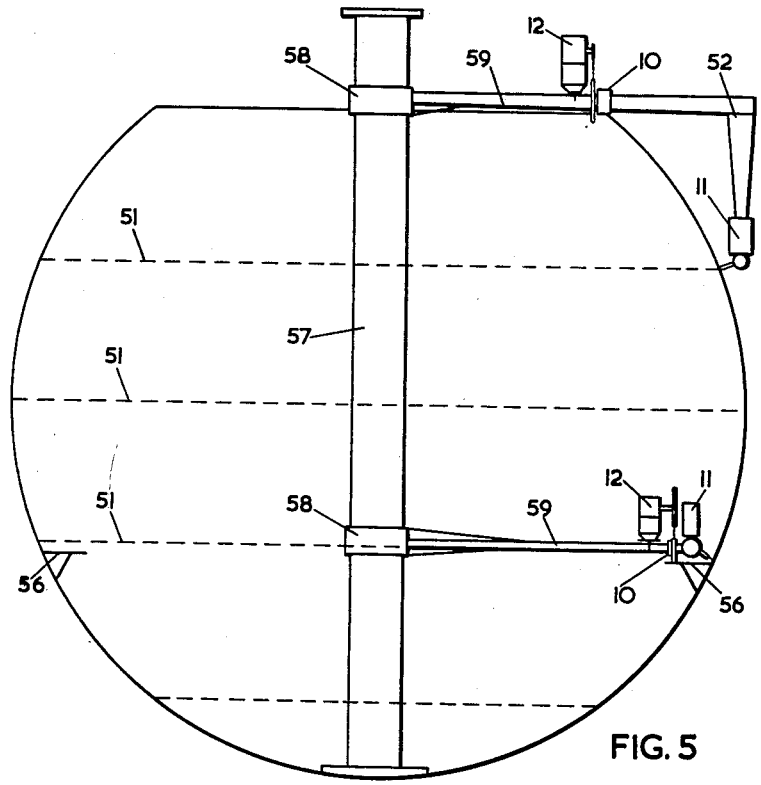
FIGURE 5 is a sectional elevation of a spherical vessel in the course of construction, showing a yet further form of apparatus in accordance with the invention in two alternative working positions.

The use of apparatus in accordance with the invention is in no way limited to the particular purpose described above with reference to FIGURE 1 of the drawing. Such apparatus may be used for welding any circular seam, such as the horizontal circular seams usually present in welded vessels having the form of spheres, cylinders, cylinders with hemispherical ends and the like. FIGURE 5 illustrates one manner of applying the invention to the welding of the latitudinal seams 51 of a spherical vessel 50. A central vertical column 57 is erected within the intended shell of the vessel and supported either by external means or by the parts of the shell already in position. Radius arm 59 has at its inner end a pivotal support member 58 which can be adjusted vertically along the stationary column 57 to support the radius arm at any required level, the figure showing the arm and its support in two of the possible alternative positions of adjustment. The welding head 11 is shown supported inside the vessel for forming a seam lying in the lower half of the sphere and supported outside the vessel for forming a seam lying in the upper half of the sphere. In the former case the welding head 11, together with motor 12 and other associated gear, is supported on the radius arm substantially as shown in FIGURE 1, while in the latter case the welding head is supported on an extension 52 of the radius arm. The wheel or roller 10 runs on a track formed by or secured to the shell of the vessel. As illustrated, when forming the lower seam driving wheel 10 runs on an annular plate 56 secured to the inner surface of the lower of the two courses of plates being welded; when forming the upper seam driving roller 10 runs on the upper edge of the upper of the two course of plates being welded.

The welding head used in the practice of the present invention may be of any of the types suitable for carrying out any of the known welding processes, including the submerged arc, the open arc with flux covered or flux cored electrodes, and the open arc inert gas shielded consumable electrode processes.

We claim:

1. Apparatus for welding a circular seam comprising a welding head carried on a radius arm, a bearing upon which said radius arm is pivotally mounted, the effective length of said radius arm between said head and bearing being adjustable, adjustable means for supporting said bearing on a generally vertical wall coaxially of any one of a plurality of circular seams of varying diameter, means for levelling said bearing on said support, and means carried by said radius arm for rotating said radius arm about said bearing and thereby moving the welding head along the line of said seam.

2. Apparatus in accordance with claim 1 in which the radius arm is provided with at least one roller or wheel running on a circular track concentric with the required circular seam, the radius arm supporting a motor arranged to drive the said roller or wheel and thereby effect rotation of the radius arm about its pivot.

3. Apparatus in accordance with claim 1, in which the central pivotal support for the radius arm affords a bearing of large diameter, whereby to resist any tendency for the head and driving means to overturn about the longitudinal axis of the radius arm.

4. Apparatus in accordance with claim 1, in which the central pivotal support for the radius arm affords a bearing of extended axial length, whereby to resist any tendency for the head and driving means to overturn about the longitudinal axis of the radius arm.

5. Apparatus in accordance with claim 2, in which the radius arm is provided with two rollers or wheels disposed in spaced relation along the length of the said circular track, so as provide in conjunction with the central pivot a three point support for the radius arm, whereby to resist any tendency of the head and driving means to overturn about the longitudinal axis of the radius arm.

6. Apparatus in accordance with claim 1 for welding a horizontally disposed circular ring to the edges of a circular aperture in the shell plates of a vessel, wherein the radius arm is supported for movement in a horizontal plane upon a centrally disposed vertical pivot shaft mounted upon a support temporarily secured within the ring and so constructed that on inverting it together with the ring and shell plates the pivot shaft can be mounted on the other face of the support.

7. Apparatus in accordance with claim 1 for welding horizontal circular seams in the shell of a vessel, in which the radius arm is supported for movement in a horizontal plane upon a vertical column disposed centrally within the vessel shell, the pivotal support for the radius arm being adjustable along the height of the column.

References Cited in the file of this patent
UNITED STATES PATENTS

| | | |
|---|---|---|
| 2,330,289 | Keir | Sept. 28, 1943 |
| 2,777,937 | Bryant | Jan. 15, 1957 |
| 2,902,588 | Zouck et al. | Sept. 1, 1959 |